(12) United States Patent
Ohtomo et al.

(10) Patent No.: US 10,634,795 B2
(45) Date of Patent: Apr. 28, 2020

(54) ROVER AND ROVER MEASURING SYSTEM

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 294 days.

(21) Appl. No.: 15/868,139

(22) Filed: Jan. 11, 2018

(65) Prior Publication Data

US 2018/0217263 A1    Aug. 2, 2018

(30) Foreign Application Priority Data

Jan. 31, 2017    (JP) .................................. 2017-015402

(51) Int. Cl.
    *G01C 15/06* (2006.01)
    *G01C 15/00* (2006.01)
    (Continued)

(52) U.S. Cl.
    CPC ............. *G01S 19/04* (2013.01); *G01C 15/002* (2013.01); *G01C 15/06* (2013.01); *G01S 19/41* (2013.01); *G01S 19/43* (2013.01)

(58) Field of Classification Search
    CPC ...... G01C 15/002; G01C 3/08; G01C 15/008; G01C 15/06; G01C 11/02; G01C 15/00; G01C 15/004; G01C 1/04
    (Continued)

(56) References Cited

U.S. PATENT DOCUMENTS

2012/0162360 A1    6/2012  Ohtomo et al.
2012/0242786 A1    9/2012  Sasagawa et al.
(Continued)

FOREIGN PATENT DOCUMENTS

JP    2011-82598 A     4/2011
JP    2012-220521 A    11/2012
JP    2016-151423 A    8/2016

*Primary Examiner* — Yaritza Guadalupe-McCall
(74) *Attorney, Agent, or Firm* — Nields, Lemack & Frame, LLC

(57) ABSTRACT

The invention provides a rover, which comprises a pole of which lower end indicates a point to be measured, a measurement auxiliary apparatus provided at a predetermined position of the pole, a direction detecting device integrally provided with the measurement auxiliary apparatus and for detecting a direction of the measurement auxiliary apparatus, and an object to be measured provided at a known distance from the lower end of the pole, wherein the measurement auxiliary apparatus comprises a horizontal detecting unit which is supported so as to be rotatable around two shafts orthogonal to each other and detects the tilts in two axial directions, motors provided so as to rotate the shafts, encoders provided respectively on the shafts, and an arithmetic processing component for controlling the motors in such a manner that the horizontal detecting unit becomes horizontal based on a detection result from the horizontal detecting unit, wherein the encoders are configured to detect a rotation amount of each shaft in a case where the horizontal detecting unit becomes horizontal, and the arithmetic processing component is configured to calculate the tilts in the two axial directions based on the detection results from the encoders and to calculate a deviation of the object to be measured in two horizontal directions with respect to the point to be measured and a deviation in a vertical direction with respect to the known distance based on a calculation result, the known distance, and a tilting direction obtained from a direction detecting device.

10 Claims, 6 Drawing Sheets

(51) Int. Cl.
*G01S 19/04* (2010.01)
*G01S 19/41* (2010.01)
*G01S 19/43* (2010.01)

(58) Field of Classification Search
USPC .......................................................... 33/294
See application file for complete search history.

(56) References Cited

U.S. PATENT DOCUMENTS

| | | | |
|---|---|---|---|
| 2016/0238708 A1 | 8/2016 | Ohtomo et al. | |
| 2017/0131404 A1* | 5/2017 | Ohtomo | G01C 15/002 |
| 2017/0350692 A1* | 12/2017 | Ohtomo | G01C 15/002 |
| 2018/0106615 A1* | 4/2018 | Ohtomo | G01S 17/89 |
| 2018/0217263 A1* | 8/2018 | Ohtomo | G01C 15/002 |
| 2018/0231639 A1* | 8/2018 | Ohtomo | G01C 15/002 |
| 2018/0284235 A1* | 10/2018 | Ohtomo | G01S 7/4817 |
| 2018/0329040 A1* | 11/2018 | Ohtomo | G01S 17/023 |
| 2018/0329041 A1* | 11/2018 | Ohtomo | G01S 17/42 |
| 2019/0063922 A1* | 2/2019 | Ohtomo | G01C 1/00 |
| 2019/0154805 A1* | 5/2019 | Ohtomo | G01S 7/4817 |
| 2019/0186912 A1* | 6/2019 | Ohtomo | G01C 15/006 |
| 2019/0339075 A1* | 11/2019 | Ohtomo | G01S 7/4817 |
| 2019/0346539 A1* | 11/2019 | Ohtomo | G01S 7/484 |
| 2019/0360806 A1* | 11/2019 | Ohtomo | G01C 15/008 |

* cited by examiner $$x'' = x1 - L \cdot \sin \theta_2$$
$$y'' = y1 - L \cdot \sin \theta_1$$
$$z'' = z1 + L(1 - \cos(\sqrt{\theta_1^2 + \theta_2^2}))$$

ROVER AND ROVER MEASURING SYSTEM

BACKGROUND OF THE INVENTION

The present invention relates to a rover and a rover measuring system used in the measurement of a point to be measured.

A rover has a pole of which the lower end is installed at a point to be measured, an object to be measured which is provided on the pole, and a measurement auxiliary device such as a data processing device and the like.

The rover is held by a measurement operator, the pole is installed on the point to be measured, the object to be measured on the pole is measured by a measuring means, and its measurement result is determined as a measurement result of the point to be measured, or the measurement result is displayed on a display unit of the measurement auxiliary apparatus.

As a means for measuring a point to be measured, there is a GNSS (Global Navigation Satellite System) which receives a signal from an artificial satellite and performs a positional measurement, and in a case of performing the positional measurement by the GNSS, a GNSS antenna is provided at an upper end of a pole, and a position of the antenna as an object to be measured is measured. Further, in a case where a total station is used as a measuring means, a reflection mirror (a prism) is provided as the object to be measured, and a position of the reflection mirror is measured by the total station.

Thus, in a case where the rover has tilted, a deviation occurs between the point to be measured and a measurement position, and a tilt of the rover is an error in a horizontal direction and a vertical direction as it is. Therefore, in a case of measuring by the rover, it is necessary to vertically set up the rover.

Conventionally, a vertical detector for detecting a verticality, e.g., a circular bubble tube or the like is provided in the rover and by visually checking the vertical detector, an operator confirms the verticality of the rover or maintains the rover vertically.

Alternatively, a method which uses an acceleration sensor or the like and measures a tilt of the rover is adopted.

However, assuring the verticality of the rover by the circular bubble tube or the like is troublesome, and there is a problem in a workability and an accuracy.

Further, when the acceleration sensor or the like is used, it is difficult to achieve a measurement accuracy due to a drift caused by a temperature or an insufficient accuracy of the acceleration sensor.

SUMMARY OF THE INVENTION

It is an object of the present invention to enable a rover to detect a tilt of the rover itself and to enable the measurement of a point to be measured irrespective of the tilt of the rover.

To attain the object as described above, a rover according to the present invention comprises a pole of which lower end indicates a point to be measured, a measurement auxiliary apparatus provided at a predetermined position of the pole, a direction detecting device integrally provided with the measurement auxiliary apparatus and for detecting a direction of the measurement auxiliary apparatus, and an object to be measured provided at a known distance from the lower end of the pole, wherein the measurement auxiliary apparatus comprises a horizontal detecting unit which is supported so as to be rotatable around two shafts orthogonal to each other and detects the tilts in two axial directions, motors provided so as to rotate the shafts, encoders provided respectively on the shafts, and an arithmetic processing component for controlling the motors in such a manner that the horizontal detecting unit becomes horizontal based on a detection result from the horizontal detecting unit, wherein the encoders are configured to detect a rotation amount of each shaft in a case where the horizontal detecting unit becomes horizontal, and the arithmetic processing component is configured to calculate the tilts in the two axial directions based on the detection results from the encoders and to calculate a deviation of the object to be measured in two horizontal directions with respect to the point to be measured and a deviation in a vertical direction with respect to the known distance based on a calculation result, the known distance, and a tilting direction obtained from a direction detecting device.

Further, in the rover according to the present invention, the direction detecting device is a camera with an optical axis orthogonal to a center line of the pole.

Further, in the rover according to the present invention, the direction detecting device is a laser pointer which emits a laser orthogonal to a center line of the pole.

Further, in the rover according to the present invention, the direction detecting device is an azimuth compass.

Further, a rover measuring system according to the present invention comprises the rover and a measuring means for measuring the object to be measured.

Further, in the rover measuring system according to the present invention, the direction detecting device is a camera with an optical axis orthogonal to a center line of the pole.

Further, in the rover measuring system according to the present invention, the direction detecting device is a laser pointer for emitting a laser orthogonal to a center line of the pole.

Further, in the rover measuring system according to the present invention, the object to be measured is a prism, and the measuring means is a total station.

Further, in the rover measuring system according to the present invention, the direction detecting device is an omnidirectional camera, a light emitted from the total station is recognized by the omnidirectional camera and a direction of the rover is determined.

Furthermore, in the rover measuring system according to the present invention, the object to be measured is a GNSS antenna, and the measuring means is a GNSS device.

According to the present invention, a rover comprises a pole of which lower end indicates a point to be measured, a measurement auxiliary apparatus provided at a predetermined position of the pole, a direction detecting device integrally provided with the measurement auxiliary apparatus and for detecting a direction of the measurement auxiliary apparatus, and an object to be measured provided at a known distance from the lower end of the pole, wherein the measurement auxiliary apparatus comprises a horizontal detecting unit which is supported so as to be rotatable around two shafts orthogonal to each other and detects the tilts in two axial directions, motors provided so as to rotate the shafts, encoders provided respectively on the shafts, and an arithmetic processing component for controlling the motors in such a manner that the horizontal detecting unit becomes horizontal based on a detection result from the horizontal detecting unit, wherein the encoders are configured to detect a rotation amount of each shaft in a case where the horizontal detecting unit becomes horizontal, and the arithmetic processing component is configured to calculate the tilts in the two axial directions based on the detection results from the encoders and to calculate a deviation of the object to be measured in two horizontal directions with respect to the point to be measured and a deviation in a vertical direction with respect to the known distance based on a calculation result, the known distance, and a tilting direction obtained from a direction detecting device. As a result, the rover itself can detect a tilt angle and a tilting direction and detect a deviation of the object to be measured with respect to the point to be measured due to the tilt, and it is possible to measure the measurement of the point to be measured irrespective of the tilt of the rover.

DETAILED DESCRIPTION OF THE PREFERRED EMBODIMENT

A description will be given below on an embodiment of the present invention by referring to the attached drawings.

Figure 1:
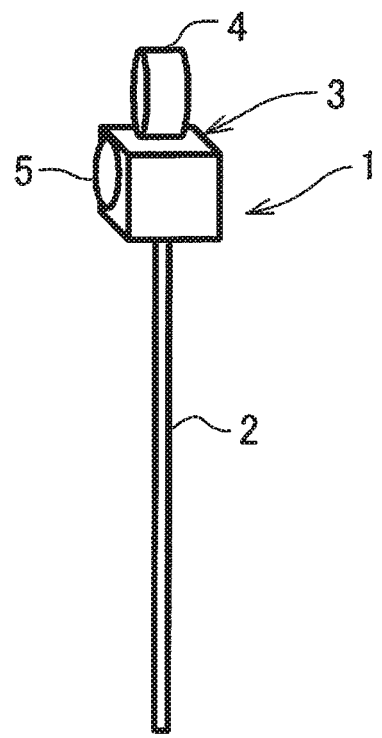
FIG. 1 is a schematic perspective view of a rover according to an embodiment of the present invention.

FIG. 1 shows a rover 1 according to an embodiment of the present invention.

The rover 1 has a pole 2 which indicates a point to be measured by its lower end, and a measurement auxiliary apparatus 3 which is provided at a predetermined position, i.e., an upper end, of the pole 2.

A prism 4 as an object to be measured is provided on an upper surface of the measurement auxiliary apparatus 3. Further, although not shown, a measuring instrument for measuring a reference position of the prism 4 is installed at a known position. As the measuring instrument, a measuring instrument having a tracking function is preferred, for instance, a total station is used.

A distance between a reference position of the prism 4 (a point measured by the measuring instrument) and the lower end of the pole 2 is a known distance.

A camera 5 which has an optical axis parallel to an optical axis of the prism 4 is provided on the measurement auxiliary apparatus 3, and a display unit 6 (to be described later) is provided on a necessary surface, e.g., a lateral surface or a back surface of the measurement auxiliary apparatus 3. Further, an attitude detecting device 7 (to be described later) for detecting a tilt of the pole 2, i.e., the rover 1, is incorporated in the measurement auxiliary apparatus 3.

Figure 2:
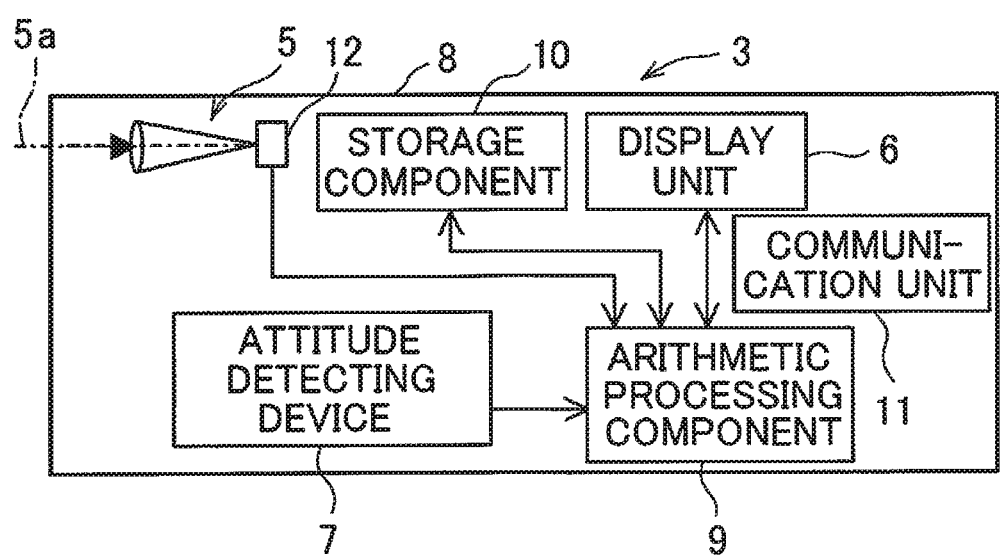
FIG. 2 is a schematic block diagram of a measurement auxiliary apparatus provided to the rover.

FIG. 2 shows a schematic configuration of the measurement auxiliary apparatus 3.

The measurement auxiliary apparatus 3 has a case 8, and the camera 5, the display unit 6, the attitude detecting device 7, an arithmetic processing component 9, a storage component 10, a communication unit 11, and the like are integrally provided in the case 8.

An optical axis 5a of the camera 5 is set in such a manner that the pole 2 becomes horizontal (i.e., the optical axis 5a becomes orthogonal with respect to a center line of the pole 2) under a condition where the pole 2 is vertical. The camera 5 includes a CCD or a CMOS sensor as a photodetection element 12, and it is arranged so that a position of each of pixels constituting the photodetection element 12 is specified on the photodetection element 12. For instance, the optical axis 5a passes through a center of the photodetection element 12, and it is arranged so that a position of each pixel is specified in a coordinate system using the center of the photodetection element 12 as an origin. The camera 5 functions as a direction detecting device which detects a direction of the rover 1.

An image captured by the camera 5 is input to the arithmetic processing component 9.

The arithmetic processing component 9 is configured to extract an image as a reference, e.g., a measurement reference point set in advance in a measurement range or the total station, based on an image signal produced by the photodetection element 12, to specify a position of an extracted image according to the coordinate system set on the photodetection element 12, and further, to calculate a direction of the optical axis 5a, i.e., a direction of the measurement auxiliary apparatus 3, with respect to the measurement reference point.

The storage component 10 stores an image acquired by the camera 5 and the measurement data such as a measurement result and the like of the measurement performed by the measuring instrument, and the arithmetic processing component 9 stores programs such as a data processing program which requires for data processing, a communication program for communicating by the communication unit 11, an image display program for displaying images on the display unit 6, and the like.

The communication unit 11 performs a data communication with the measuring instrument, receives a result as measured, by the measuring instrument, and a received measurement result is stored in the storage component 10.

Next, by referring to FIG. 3 to FIG. 5, a description will be given below on the attitude detecting device 7.

Figure 3:
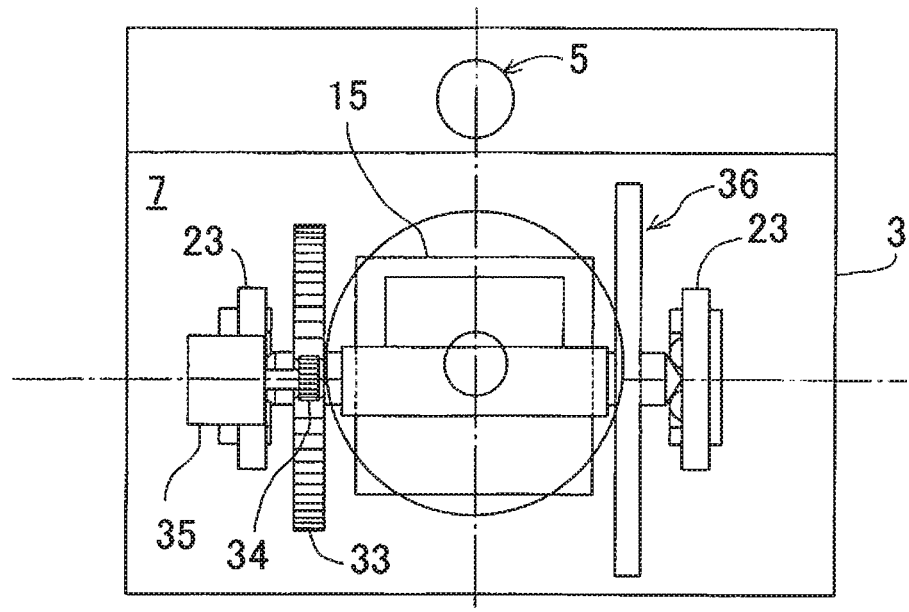
FIG. 3 is a front view of an attitude detecting device used in the rover.
Figure 4:
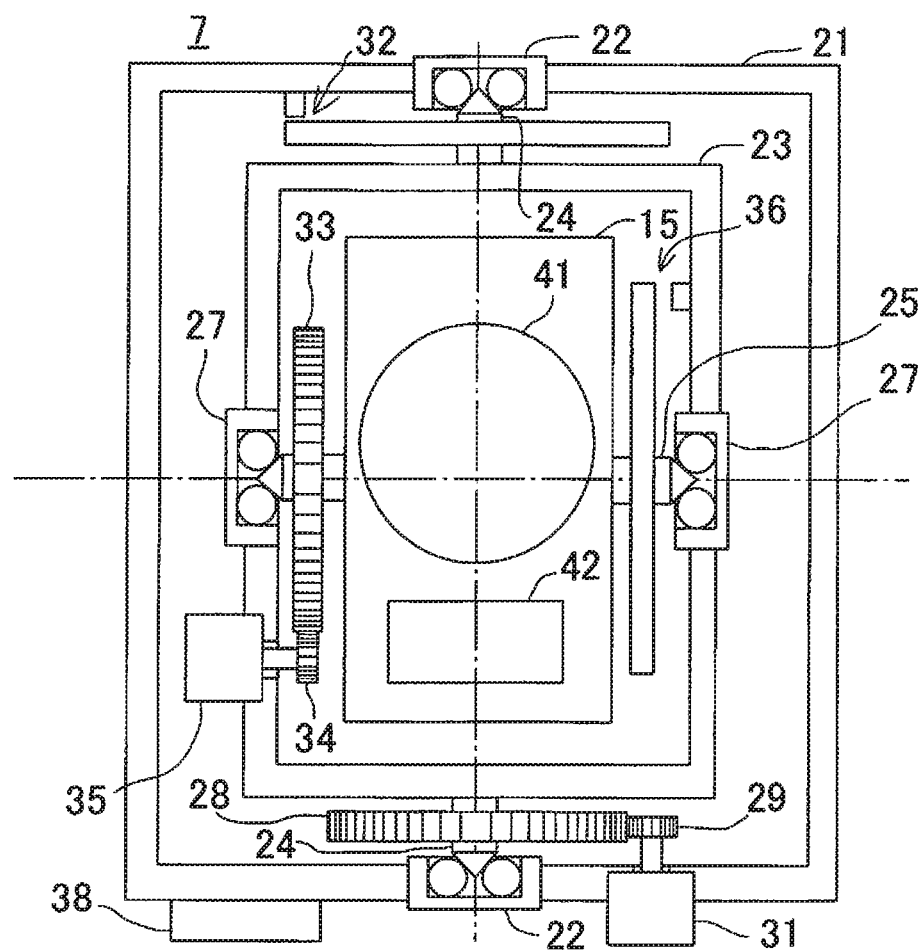
FIG. 4 is a plan view of the attitude detecting device.
Figure 5:
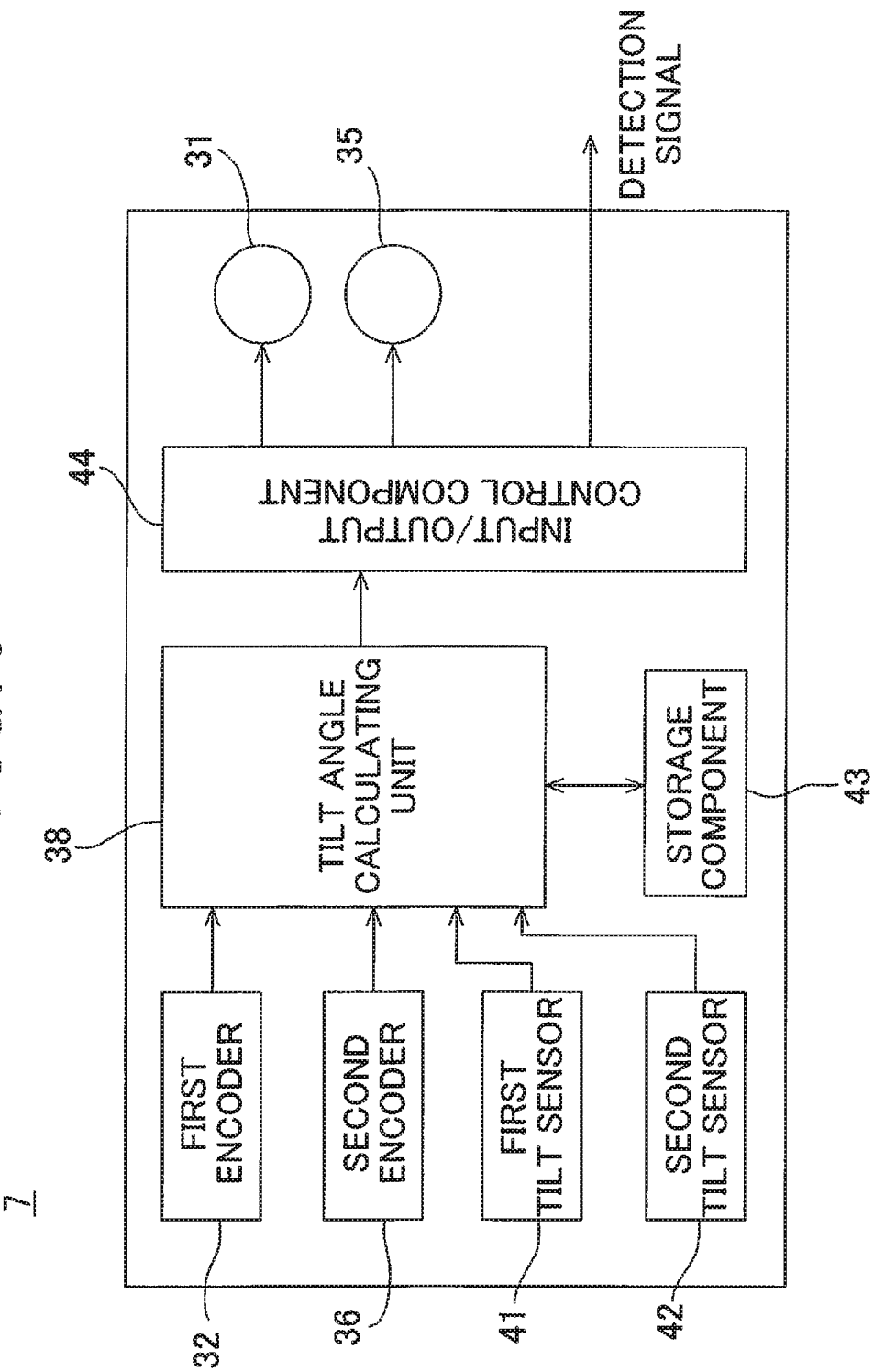
FIG. 5 is a schematic block diagram of the attitude detecting device.

FIG. 3 shows a front view under such condition that the attitude detecting device 7 is installed at a horizontal position, and FIG. 4 shows a plan view of the attitude detecting device 7. In FIG. 3, when the attitude detecting device 7 detects the verticality of the pole 2, the camera 5 is associated with the attitude detecting device 7 so that the optical axis 5a of the camera 5 becomes horizontal. It is to be noted that FIG. 3 shows a case where the camera 5 is integrally provided with the attitude detecting device 7.

The attitude detecting device 7 has a horizontal detecting unit 15 for detecting the horizontality. As to be described below, the horizontal detecting unit 15 has a structure as supported horizontally via a gimbal mechanism.

An inner frame 23 with a rectangular frame shape is provided inside an outer frame 21 with a rectangular frame shape, and the horizontal detecting unit 15 is provided inside the inner frame 23. The outer frame 21 is fixed on the case 8 or doubles as the case 8.

First horizontal shafts 24 and 24 are protruded from side surfaces (an upper surface and a lower surface in FIG. 4) of the inner frame 23. The first horizontal shafts 24 and 24 are rotatably fitted to the bearings 22 and 22 provided on the outer frame 21. The first horizontal shafts 24 and 24 have a first horizontal axis extending in a horizontal direction, and the inner frame 23 can rotate around the first horizontal shafts 24 and 24 over 360° in a vertical direction.

The horizontal detecting unit 15 is supported by a second horizontal shaft 25, and both end portions of the second horizontal shaft 25 are rotatably fitted to the bearings 27 and 27 provided to the inner frame 23. The second horizontal shaft 25 has a second horizontal axis which orthogonally crosses the first horizontal axis within the same plane and extends in a horizontal direction, and the horizontal detecting unit 15 can rotate around the second horizontal shaft 25 over 360° in a vertical direction.

The horizontal detecting unit 15 is rotatably supported in two axial directions with respect to the outer frame 21, and a mechanism which rotatably supports the inner frame 23 and a mechanism which rotatably supports the horizontal detecting unit 15 constitute a gimbal mechanism. Therefore, it is configured so that the horizontal detecting unit 15 is supported with respect to the outer frame 21 via the gimbal mechanism, and further, there is no mechanism which restricts a rotation of the inner frame 23, and hence the horizontal detecting unit 15 can freely rotate with respect to the outer frame 21 in all directions.

A first driven gear 28 is fixed to one of the first horizontal shafts 24 and 24, e.g., on the first horizontal shaft 24 of a lower side in FIG. 4, and a first driving gear 29 meshes with the first driven gear 28. Further, a first motor 31 is provided on a lower surface of the outer frame 21, and the first driving gear 29 is fixed to an output shaft of the first motor 31.

A first encoder 32 is provided on the other of the first horizontal shafts 24 and 24. The first encoder 32 is adapted to detect a first rotation angle (a first tilt angle) of the inner frame 23 with respect to the outer frame 21.

A second driven gear 33 is fixed to one end portion of the second horizontal shaft 25, and a second driving gear 34 meshes with the second driven gear 33. Further, a second motor 35 is disposed to a side surface (a left side surface in the drawing) of the inner frame 23, and the second driving gear 34 is fixed to an output shaft of the second motor 35.

A second encoder 36 is provided on the other end portion of the second horizontal shaft 25, and the second encoder 36 is adapted to detect a second rotation angle (a second tilt angle) of the horizontal detecting unit 15 with respect to the inner frame 23.

The first encoder 32 and the second encoder 36 are electrically connected to a tilt angle calculating unit 38.

The horizontal detecting unit 15 has a first tilt sensor 41 and a second tilt sensor 42, and the first tilt sensor 41 and the second tilt sensor 42 are electrically connected to the tilt angle calculating unit 38.

A further description will be given on the attitude detecting device 7 by referring to FIG. 5.

Other than the first encoder 32, the second encoder 36, the first tilt sensor 41, the second tilt sensor 42, the tilt angle calculating unit 38, the first motor 31 and the second motor 35, the attitude detection device 7 further comprises a storage component 43 and an input/output control component 44.

The storage component 43 stores programs such as a calculation program for an attitude detection and data such as calculation data, or the like.

The input/output control component 44 drives the first motor 31 and the second motor 35 based on a control command output from the tilt angle calculating unit 38, tilts the horizontal detecting unit 15 and the inner frame 23, and controls the horizontal detecting unit 15 so as to detect a horizontality.

The first tilt sensor 41 is for detecting the horizontality with high accuracy, e.g., a tilt detector which allows a detection light to enter a horizontal liquid surface and detects a horizontality according to a change in a reflection angle of a reflection light, or is a bubble tube which detects a tilt based on a positional change in a sealed air bubble. Further, the second tilt sensor 42 is for detecting a change in a tilt with high responsiveness and also detects a tilt amount in a wide range, and is, e.g., an acceleration sensor.

It is to be noted that both the first tilt sensor 41 and the second tilt sensor 42 can individually detect tilts in two axial directions, i.e., a rotating direction (a tilting direction) as detected by the first encoder 32 and a rotating direction (a tilting direction) as detected by the second encoder 36.

The tilt angle calculating unit 38 calculates a tilt angle and a tilting direction based on the detection results from the first tilt sensor 41 and the second tilt sensor 42. Further, the tilt angle calculating unit 38 calculates a rotation angle of the first encoder 32 and a rotation angle of the second encoder 36 corresponding to the tilt angle and the tilting direction.

By synthesizing the calculated rotation angle of the first encoder 32 and the calculated rotation angle of the second encoder 36, a tilt angle and a tilting direction are calculated. The tilt angle and the tilting direction correspond to a tilt angle and a tilting direction (a relative tilt angle) of the case 8, i.e., the measurement auxiliary apparatus 3 with respect to a horizontality.

The first motor 31, the second motor 35, the first encoder 32, the second encoder 36 and the tilt angle calculating unit 38 constitute a relative tilt angle detecting unit.

It is to be noted that, in a case where the outer frame 21 is horizontally installed (i.e., in a case where the measurement auxiliary apparatus 3 is horizontal), the attitude detecting device 7 is set in such a manner that the first tilt sensor 41 detects the horizontality and further is set in such a manner that both an output of the first encoder 32 and an output of the second encoder 36 indicate a reference position (a rotation angle 0°).

A description will be given below on an operation of the attitude detecting device 7.

First, a description will be given on a case where a change in tilt is slow and a tilt is detected with high accuracy.

When the attitude detecting device 7 tilts, the first tilt sensor 41 outputs a signal corresponding to the tilt.

The tilt angle calculating unit 38 calculates a tilt angle and a tilting direction based on the signal from the first tilt sensor 41 and calculates the rotation amounts of the first motor 31 and the second motor 35 in order to make the tilt angle and the tilting direction to zero based on a calculation result. The tilt angle calculating unit 38 issues a driving command for driving the first motor 31 and the second motor 35 by the rotation amounts via the input/output control component 44.

The first motor 31 and the second motor 35 are driven so as to be tilted reversely to the calculated tilt angle and the calculated tilting direction by driving the first motor 31 and the second motor 35. Driving amount (rotation angle) of each of the first motor 31 and the second motor 35 is detected by the first encoder 32 and the second encoder 36 respectively, when the rotation angle is equal to the result of calculation, the driving of the first motor 31 and the second motor 35 is stopped.

Further, the rotation of the first motor 31 and the second motor 35 are finely adjusted so that the first tilt sensor 41 detects the horizontality.

Under this condition, the horizontal detecting unit 15 is controlled horizontally under such condition that the outer frame 21 is tilted.

Therefore, in order to make the horizontal detecting unit 15 horizontal, the inner frame 23 and the horizontal detecting unit 15 are tilted by the first motor 31 and the second motor 35. A tilt angle and a tilting direction as occurred thereby, are determined based on the rotation angles detected by the first encoder 32 and the second encoder 36.

The tilt angle calculating unit 38 calculates a tilt angle and a tilting direction of the attitude detecting device 7 based on the detection results of the first encoder 32 and the second encoder 36 when the first tilt sensor 41 detects the horizontality. The result of this calculation indicates an attitude of the attitude detecting device 7 after the tilting.

The tilt angle calculating unit 38 outputs the calculated tilt angle and tilting direction to outside, i.e., to the arithmetic processing component 9, as a detection signal of the attitude detecting device 7.

It is needless to say that the tilt angle and the tilting direction as detected by the attitude detecting device 7 are the tilt angle and the tilting direction of the optical axis 5a with respect to the horizontality. The arithmetic processing component 9 calculates a displacement amount of the prism 4 with respect to a point to be measured based on a detection result of the attitude detecting device 7 and a distance between the prism 4 and the lower end of the pole 2. Therefore, no matter what attitude the measurement auxiliary apparatus 3 takes, an error of the prism 4 caused due to a tilt can be corrected, and an accurate measurement can be performed.

Next, a description will be given on an operation of the attitude detecting device 7 under a condition where the rover 1 is carried by an operator (e.g., a condition where an operator carries the rover 1 and moves), or the like.

Under carried condition, the attitude of the attitude detecting device 7 changes every moment. Therefore, the attitude detection is performed based on the result of detection of the second tilt sensor 42 with high responsiveness.

First, a horizontal condition is detected by the first tilt sensor 41, and the attitude change thereafter is obtained by the second tilt sensor 42 with high responsiveness. If the attitude detection is controlled based on the result of detection from the second tilt sensor 42, the tilt angle and the tilting direction of the attitude detecting device 7 can be detected in real time.

Further, as shown in the structure given in FIG. 3 and FIG. 4, there is nothing to restrict the rotation of the horizontal detecting unit 15 and the rotation of the inner frame 23. Therefore, both the horizontal detecting unit 15 and the inner frame 23 can be rotated over 360° or more. That is, regardless of whatever attitude the attitude detecting device 7 takes (e.g., even when the attitude detecting device 7 is upside down), the attitude detection can be performed in all directions.

Therefore, there is no restriction on the tilt measuring range, and it is possible to perform the attitude detection in a wide range and in any of the attitudes.

In a case where high responsiveness is required, the attitude detection is performed based on the result of the detection by the second tilt sensor 42. However, the second tilt sensor 42 is generally lower in detection accuracy as compared with the first tilt sensor 41.

In the present embodiment, the first tilt sensor 41 with higher accuracy and the second tilt sensor 42 with high responsiveness are provided. As a result, the attitude detection can be performed with high accuracy based on only the result of the detection by the second tilt sensor 42.

Based on the tilt angle detected by the second tilt sensor 42, the first motor 31 and the second motor 35 are driven so that the tilt angle becomes 0°, and further, the driving of the first motor 31 and the second motor 35 is continued until the first tilt sensor 41 detects the horizontality. In case a deviation occurs between the values of the first encoder 32 and the second encoder 36 when the first tilt sensor 41 detects the horizontality—that is, in a case where the deviation occurs between an actual tilt angle and the tilt angle detected by the second tilt sensor 42, it is possible to calibrate the tilt angle of the second tilt sensor 42 based on the deviation.

Therefore, if the relationship, between the detected tilt angle of the second tilt sensor 42 and the horizontal detection by the first tilt sensor 41 and a tilt angle determined, based on the detection results of the first encoder 32 and the second encoder 36 is obtained, it is possible to perform a calibration of the tilt angle detected by the second tilt sensor 42. Based on this calibration, an accuracy can be improved in the attitude detection with high responsiveness by using the second tilt sensor 42.

By the fact that the horizontal detecting unit 15 is used as a combination of the first tilt sensor 41 with high accuracy and the second tilt sensor 42 with high responsiveness, the measurement auxiliary apparatus 3 is mounted on a mobile object, and the measurement can be performed with high accuracy in real time while moving.

It is to be noted that in a case where the measurement auxiliary apparatus 3 is supported in a stable state or in a case where the measurement auxiliary apparatus 3 is supported in a less moving state, in a condition where the first tilt sensor 41 with high accuracy can be followed, the second tilt sensor 42 with high responsiveness may be omitted. For instance, as described above, in a case where the measurement auxiliary apparatus 3 is installed on a support member such as a pole or the like and the measurement is performed by erecting the pole on a ground surface, or the like, a condition is with less moving and in a stable condition. In a case where the purpose of use of the rover 1 is limited to a use in a condition where the pole is erected from the ground surface, the second tilt sensor 42 with high responsiveness may be omitted.

On the other hand, in a case where a follow-up characteristic is required but a high accuracy is not required, the first tilt sensor 41 may be omitted and only the second tilt sensor 42 may be used.

A description will be given below on measurements using the rover 1 in the present embodiment by referring to FIG. 6 to FIG. 10.

Figure 6:
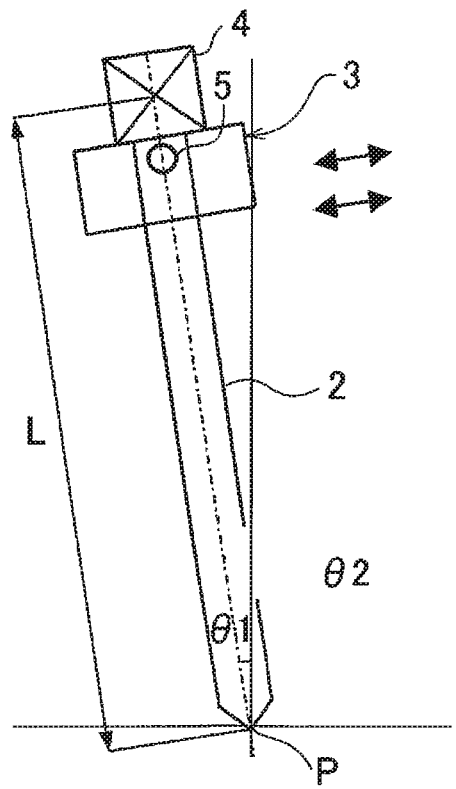
FIG. 6 is an explanatory drawing of a case where an error caused due to a tilt is corrected in the present embodiment.
Figure 7:
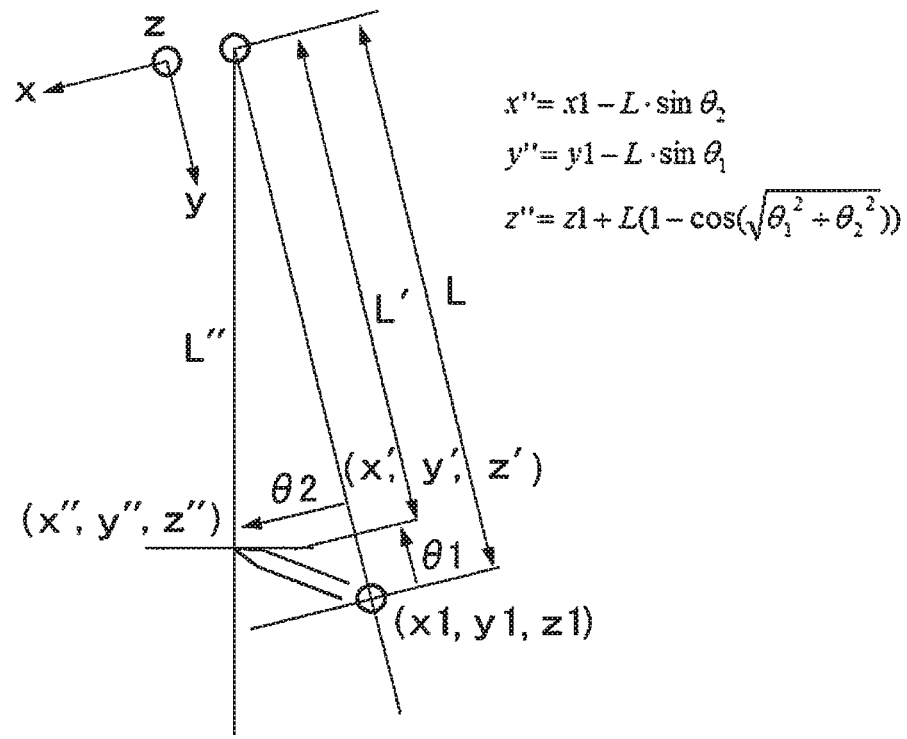
FIG. 7 is an explanatory drawing of a case where the error caused due to the tilt is corrected in the present embodiment.

In FIG. 6 and FIG. 7, a measuring means is a total station and has a tracking function.

A prism 4 is provided at an upper end of the rover 1, and a distance between a reference position of the prism 4 and a lower end of the pole 2 is L.

In FIG. 6, the lower end of the pole 2 is installed at a point to be measured P. The tilt angles with respect to the vertical at this time are θ1 and θ2. Here, the tilt angle θ1 is a direction directing from the point to be measured to a measurement reference point (not shown) (i.e., a direction connecting the point to be measured with the measurement reference point), and the tilt angle θ2 is a direction which is orthogonal with respect to the direction connecting the point to be measured with the measurement reference point. Further, when a measuring instrument such as a total station is used as the measuring means, an installing position of a total station 45 can be determined as the measurement reference point (see FIG. 8 and FIG. 10).

A result as measured by the total station 45 is received by the communication unit 11 and a measurement result is stored in the storage component 10.

An image including the measurement reference pint can be acquired by the camera 5, and by adjusting a direction of the rover 1 in such a manner that an image of the measurement reference point is positioned at a center of the photodetection element 12, it is possible to face the direction of the rover 1 to the measurement reference point.

When facing the rover 1 to the measurement reference point, an operator may perform the operation while confirming the measurement reference point on the display unit 6, or a deviation of a reference point with respect to the center of the photodetection element 12 may be obtained based on an output signal from the photodetection element 12, the deviation may be displayed in the display unit 6, and the direction may be adjusted so that the deviation becomes zero.

It is to be noted that, when a measuring instrument (a total station) with a tracking function is used, a light such as a tracking light and the like is emitted from the measuring instrument, and a direction of the rover 1 or a direction deviation (a deviation of the direction) may be obtained from a receiving position of the tracking light on the photodetection element 12.

By the attitude detecting device 7, the tilt angles of the rover 1 in two directions with respect to the horizontality, i.e., the tilt angles θ1 and θ2 in two directions with respect to the verticality, can be detected.

In FIG. 6, when a position (a three-dimensional coordinate) of the prism 4 is measured by the total station, a measurement results includes an error caused due to the tilt angles θ1 and θ2.

First, in a case where the rover 1 tilts in two directions at the tilt angles θ1 and θ2, a position (a three-dimensional coordinate) of the prism 4 at this time is (x″, y″, z″). It is to be noted that the tilt angle in an x direction is θ1 and the tilt angle in a y direction is θ2.

First, a displacement of the x direction due to the tilt of the rover 1 is L sin θ2, and a displacement of the y direction due to the tilt of the rover 1 is L sin θ1. Further, a displacement of a z direction (a vertical direction) when the rover 1 tilts in the two directions is $L(1-\cos\sqrt{(\theta1^2+\theta2^2)})$.

Therefore, a position of the prism 4 is as follows.

$$x''=x1-L\sin\theta2$$

$$y''=y1-L\sin\theta1$$

$$z''=z1+L(1-\cos\sqrt{(\theta1^2+\theta2^2)})$$

By detecting the tilt angles of the rover 1 at the time of measurement, it is possible to calculate an error caused due to the tilts and to correct a measurement value based on the obtained error. Therefore, the operator can perform an accurate measurement without maintaining the rover 1 in a precise vertical condition.

It is to be noted that, in the description as given above, the operator set the rover 1 to face the measurement reference point based on the measurement reference point displayed on the display unit 6, but since a deviation of direction can be determined on the photodetection element 12 from a positional displacement of the measurement reference point with respect to the center of the photodetection element 12, the rover 1 does not have to be set to precisely face the measurement reference point as long as measurement value is further (automatically) corrected based on the obtained deviation by calculation.

Figure 8:
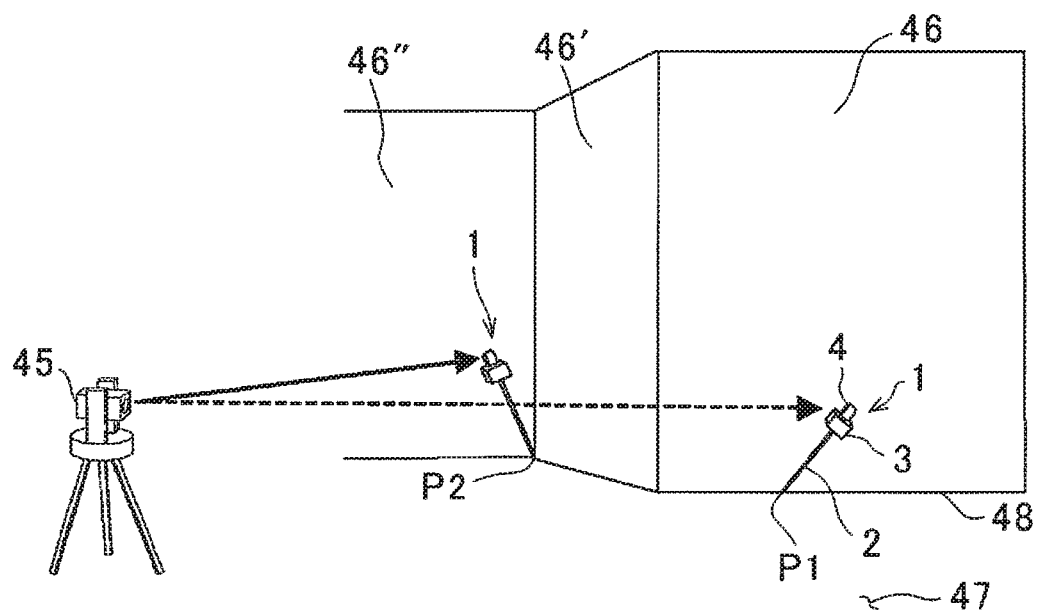
FIG. 8 is an explanatory drawing of a measurement in the present embodiment.
Figure 9:
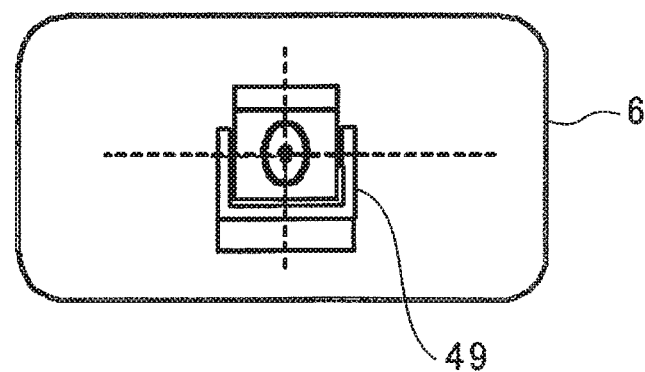
FIG. 9 is a view showing an example of a display at the time of measurement in the present embodiment.
Figure 10:
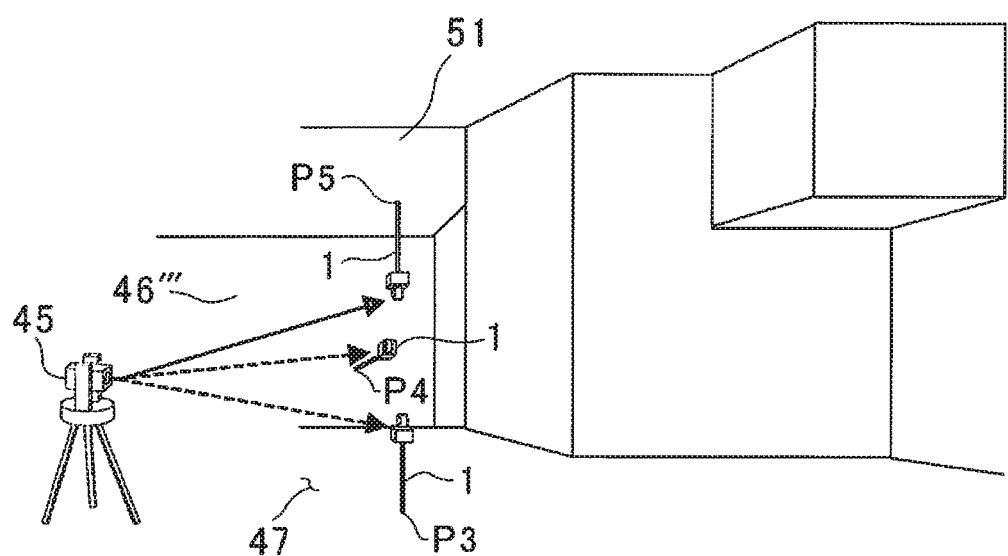
FIG. 10 is an explanatory drawing of the measurement in the present embodiment.

FIG. 8 to FIG. 10 show an embodiment in a case where the rover 1 is used and the measurement is performed indoors.

First, FIG. 8 shows a measurement when the rover 1 cannot be maintained vertically. It is to be noted that, as a measuring means, the total station 45 is used.

The total station 45 is installed at a known position on a floor surface in a room.

In case of measuring a point to be measured P1 existing on a boundary line 48 between a wall surface 46 and a floor surface 47, the lower end of the pole 2 is positioned at the point to be measured P1. The rover 1 tilts in such a manner that the rover 1 is separated from the wall surface 46, and this tilt is detected by the attitude detecting device 7.

Regarding a direction of the rover 1, an image 49 acquired by the camera 5 is displayed on the display unit 6, and by visually confirming the image 49, the direction of the rover 1 is determined. Therefore, the rover 1 can be set to face the total station 45 (the measurement reference point) based on the image 49.

It is to be noted that FIG. 9 shows a state where the image 49 of the total station 45 is displayed on the display unit 6.

A position of the prism 4 is measured by the total station 45, and a measurement value is corrected by using a tilt angle as detected by the attitude detecting device 7. Therefore, an accurate measurement value of the point to be measured P1 can be determined irrespective of an attitude of the rover 1.

Further, in a case of measuring a corner of the room as a point to be measured P2, when the lower end of the pole 2 is set at the point to be measured P2, the rover 1 tilts in such a manner that the rover 1 is separated from the wall surfaces 46′ and 46″. Since the attitude detecting device 7 can detect the tilts of the rover 1 in all the directions, the tilts of the rover 1 can be detected by the attitude detecting device 7. A position of the prism 4 is measured by the total station 45 and corrected based on the detected tilt angles, and an accurate measurement value of the point to be measured P2 can be obtained.

FIG. 10 shows a case of measuring an arbitrary point to be measured P3 on the floor surface 47, an arbitrary point to be measured P4 on a wall surface 46‴, and an arbitrary point to be measured P5 on a ceiling 51.

Since the attitude detecting device 7 can detect the tilts in all attitudes of 360°, even if the rover 1 takes a horizontal attitude like in a case of measuring the point to be measured P4, or even if the rover 1 is turned upside down like in a case of measuring the point to be measured P5, the tilts can be measured by the attitude detecting device 7 without any problem.

Further, it is possible to judge from an image whether the rover 1 is taking the horizontal attitude or an inverted attitude. Further, in a case of performing the measurement, by acquiring an image simultaneously with the measurement and by storing the image in association with a measurement value, the attitude of the rover 1 at the time of the measurement can be judged, and the workability can be improved when performing a processing of data after the measurement.

In a case where the rover 1 is used in an environment where a signal from a satellite can be received, for instance, when the rover 1 is used outdoors, a GNSS antenna may be provided at an upper end of the pole as an object to be measured in place of the prism 4. Further, in this case, a GNSS device may be used as a measuring means, and a point to be measured may be measured by the GNSS device. In this case, likewise, it is possible to detect a tilt angle of the pole 2 by the attitude detecting device 7, correct a measurement result based on the detected tilt angle, and perform an accurate measurement of the point to be measured. It is to be noted that a distance between the GNSS antenna and the lower end of the pole is already known.

Further, when the GNSS device is used as the measuring means, an azimuth compass may be provided on the rover 1, a direction of the rover 1 may be detected by the azimuth compass, and a direction of a tilt of the rover 1 may be obtained. Alternatively, the direction and the tilting direction of the rover 1 may be obtained based on an image acquired by the camera.

Further, when the total station is used as the measuring means, an omnidirectional camera (e.g., an omnidirectional camera disclosed in Japanese Unexamined Patent Application Publication No. 2011-82598 or Japanese Unexamined Patent Application Publication No. 2012-220521) may be used as the camera 5, a light projected from the total station may be recognized by the omnidirectional camera, and a direction may be determined. Here, as the light projected from the total station, there are a guide light, a light of a distance meter, and a light in an automatic sighting or a tracking, and any one of them may be used.

In the embodiment as given above, although the camera 5 is provided for detecting a direction of the rover 1, as a direction detecting device, a laser pointer which emits a laser beam orthogonal to a center line of the pole 2, may be used.

The invention claimed is:

1. A rover comprising: a pole of which lower end indicates a point to be measured, a measurement auxiliary apparatus provided at a predetermined position of said pole, a direction detecting device integrally provided with said measurement auxiliary apparatus and for detecting a direction of said measurement auxiliary apparatus, and an object to be measured provided at a known distance from the lower end of said pole, wherein said measurement auxiliary apparatus comprises a horizontal detecting unit which is supported so as to be rotatable around two shafts orthogonal to each other and detects the tilts in two axial directions, motors provided so as to rotate said shafts, encoders provided respectively on said shafts, and an arithmetic processing component for controlling said motors in such a manner that said horizontal detecting unit becomes horizontal based on a detection result from said horizontal detecting unit, wherein said encoders are configured to detect a rotation amount of each shaft in a case where said horizontal detecting unit becomes horizontal, and said arithmetic processing component is configured to calculate the tilts in said two axial directions based on the detection results from said encoders and to calculate a deviation of said object to be measured in two horizontal directions with respect to said point to be measured and a deviation in a vertical direction with respect to said known distance based on a calculation result, said known distance, and a tilting direction obtained from a direction detecting device.

2. The rover according to claim 1, wherein said direction detecting device is a camera with an optical axis orthogonal to a center line of said pole.

3. The rover according to claim 1, wherein said direction detecting device is a laser pointer which emits a laser orthogonal to a center line of said pole.

4. The rover according to claim 1, wherein said direction detecting device is an azimuth compass.

5. A rover measuring system comprising: said rover according to claim 1 and a measuring means for measuring said object to be measured.

6. The rover measuring system according to claim 5, wherein said direction detecting device is a camera with an optical axis orthogonal to a center line of said pole.

7. The rover measuring system according to claim 5, wherein said direction detecting device is a laser pointer for emitting a laser orthogonal to a center line of said pole.

8. The rover measuring system according to claim 5, wherein said object to be measured is a prism, and said measuring means is a total station.

9. The rover measuring system according to claim 8, wherein said direction detecting device is an omnidirectional camera, a light emitted from said total station is recognized by said omnidirectional camera and a direction of said rover is determined.

10. The rover measuring system according to claim 5, wherein said object to be measured is a GNSS antenna, and said measuring means is a GNSS device.

* * * * *